Sept. 25, 1951 W. HESS 2,568,957
ROTARY PORTABLE SAW SUPPORT MITERING MACHINE
Filed July 1, 1948 2 Sheets-Sheet 1
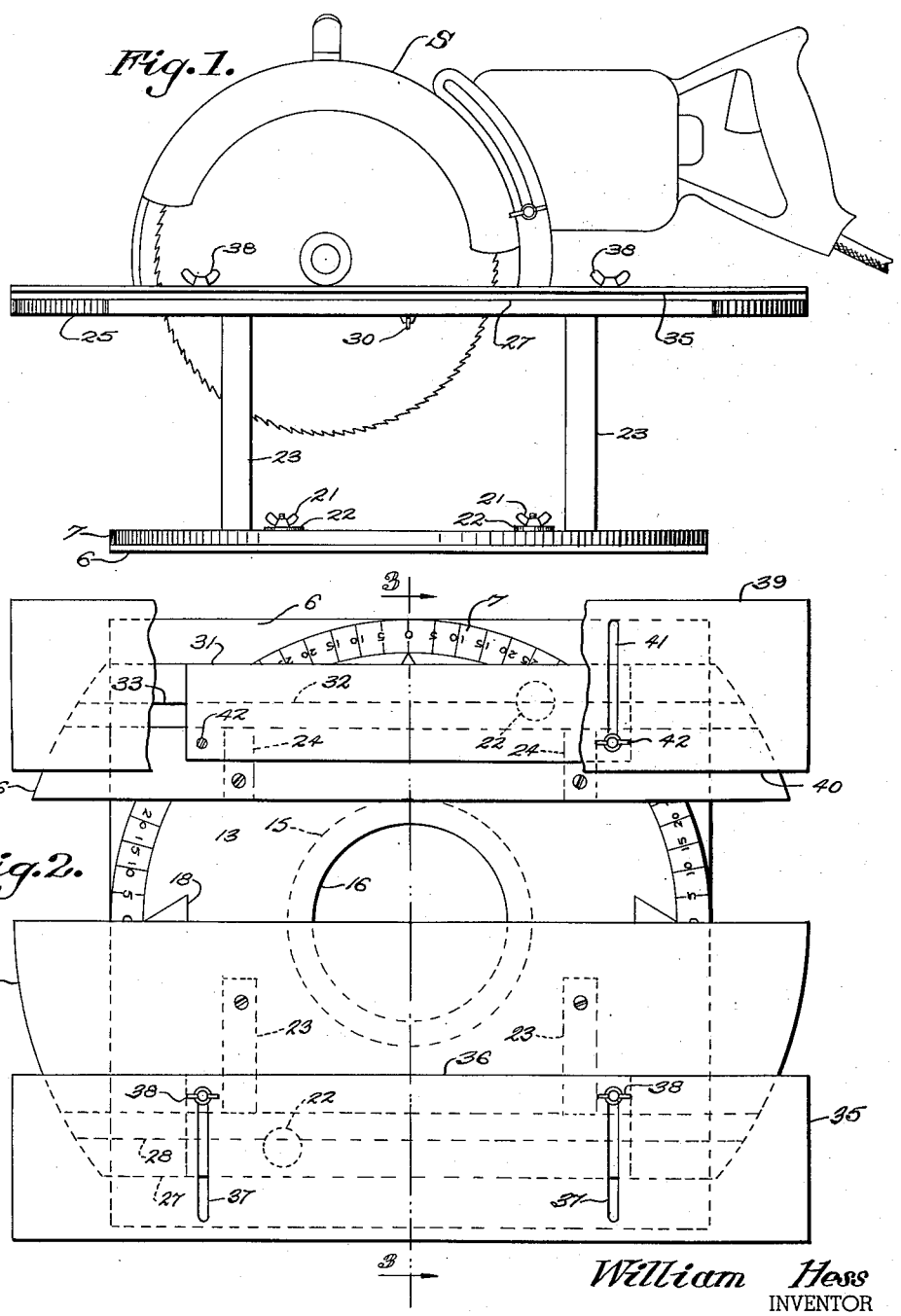
William Hess
INVENTOR
BY
ATTORNEYS.

Sept. 25, 1951 W. HESS 2,568,957
ROTARY PORTABLE SAW SUPPORT MITERING MACHINE
Filed July 1, 1948 2 Sheets-Sheet 2
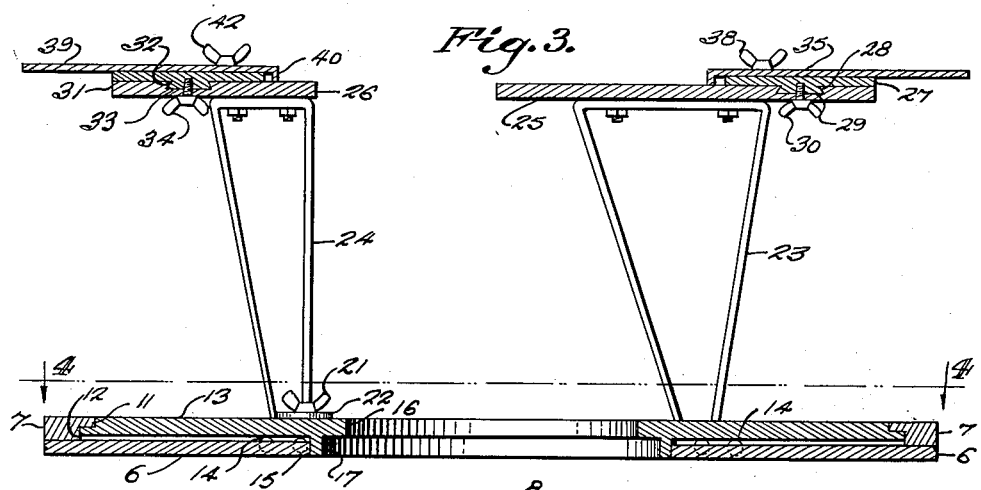
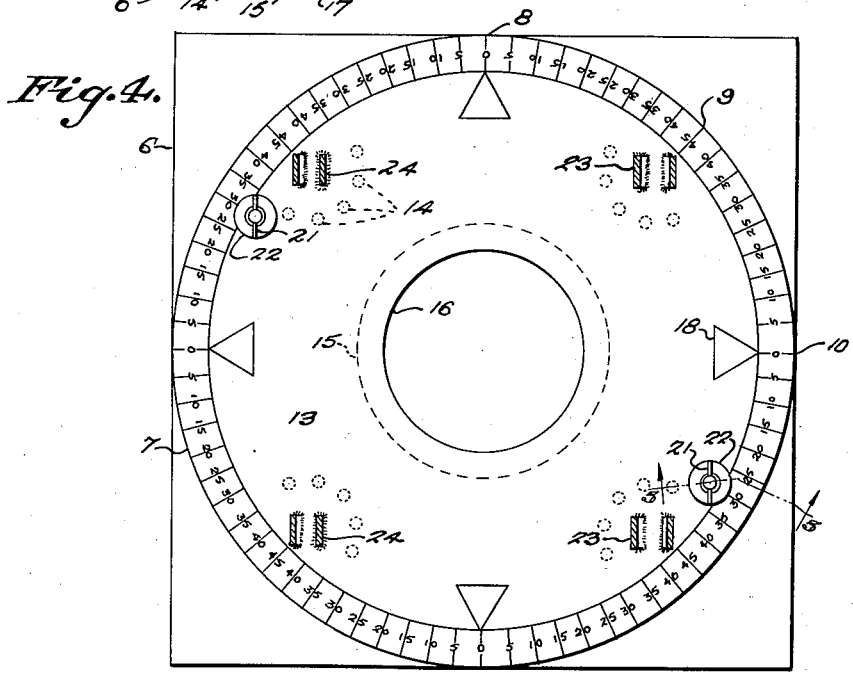
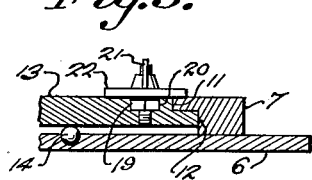
William Hess
INVENTOR
BY C. A. Snow & Co.
ATTORNEYS.

Patented Sept. 25, 1951

2,568,957

UNITED STATES PATENT OFFICE 2,568,957

ROTARY PORTABLE SAW SUPPORT MITERING MACHINE

William Hess, Hanford, Calif.

Application July 1, 1948, Serial No. 36,541

3 Claims. (Cl. 143—6)

1

This invention relates to a miter box, and more particularly to a device of this character designed for guiding a power saw, and more specifically a portable electric saw, in making miter cuts.

By way of background, it may be noted that portable electric saws have in general supplanted the conventional hand saw, in cutting lumber to size and shape on the site of construction of a building or other structure. As a requisite to speed and accuracy in the cutting operations, it is essential that apparatus be provided for guiding saws of this type in making miter cuts.

Apparatus for this purpose has already been devised, but to my knowledge, such apparatus as has heretofore been devised is cumbersome, relatively expensive, not readily set up, and in other respects has not proved entirely satisfactory.

Accordingly, it is an important purpose of the present invention to provide apparatus of the type stated which will be comparatively light and easily transported, but which will nevertheless be strong and durable and inexpensive of manufacture, with a minimum of parts simply arranged in a manner whereby they will not readily get out of order.

Another important object of the invention is to provide apparatus as stated which will be capable of swift adjustment relative to the angle at which the miter cut is to be made, and which when adjusted is swiftly and easily tightened against deviation from said angle.

Still another important object is to provide a device of the character described which will support a portable electric saw in a manner whereby the saw is guided along a true and exact line, the device being so constructed as to be capable of swift adjustment for guiding portable electric saws of various sizes and makes.

Another important object is to provide a device of the type stated which in use remains to one side of the lumber to be cut, so that it is not necessary that the lumber be moved into a position where it can be cut except to a minimum extent, it being unnecessary that the lumber extend through the apparatus which I have devised.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

2

Referring to the drawings:

Figure 1 is a side elevational view of apparatus constructed in accordance with the invention, a portable electric saw being illustrated in supported position upon the apparatus.

Figure 2 is a top plan view, portions being broken away.

Figure 3 is a section on line 3—3 of Fig. 2.

Figure 4 is a section on line 4—4 of Fig. 3.

Figure 5 is a detail section on line 5—5 of Fig. 4.

Referring to the drawings in detail, the reference numeral 6 designates a base which is rectangular in conformation. I prefer that the base be made wholly square, for reasons which will appear hereinafter.

The base 6 is flat, and fixedly secured to its upper surface is a ring 7 that is degree-marked throughout its circumference. Referring particularly to Fig. 4, each quarter or quadrant of the ring 7 is marked zero degrees at one end, as shown at 8. The quadrant, from said end, is degree-marked in ascending order from said end up to 45° at its middle, as shown at 9. Then, the degree markings proceed in descending order from 45° back to 0° at the other end of the quadrant as shown at 10. This arrangement is continued throughout the circumference of the ring 7.

The ring 7, graduated as described above, comprises a means for determining the proper positions to which a saw-supporting carriage (to be described) should be moved for the purpose of causing saw S to make the desired miter cut. In this connection, ring 7 not only comprises a means of this character, but also discharges the function of supporting the carriage to the base 6 for rotative movement thereon. To this end, an inwardly extended flange 11 is formed integral with the ring, this overlying an outwardly extended flange 12 formed integral with the bottom plate 13 of the rotatable carriage. Bottom plate 13 is flat, and generally annular in conformation. It is normally freely rotatable on base 6. For the purpose of permitting free rotation of the bottom plate 13 on the base, it is preferred to recess the upper surface of the base to accommodate spaced semi-circular series of anti-friction elements 14 (see Figs. 3, 4, and 5). By means of these elements, the bottom plate 13 is spaced slightly above the base 6 and is supported thereon for free rotation.

The bottom plate 13 is formed with a large central opening 16, this construction being preferred for the purpose of permitting saw dust forming during the cutting operation to drop through the apparatus without piling up on the bottom plate. Base 6 is also formed with a large central opening 15, and the bottom plate 13 has a depending annular flange 17 extending into and slidably engaging the wall of the opening 15 of the base 6. Thus, the provision of flange 17 prevents the saw dust, or other foreign elements, from entering the space between the base 6 and the bottom plate 13 of the carriage thus keeping the base wholly clean so as to permit the antifriction elements 14 to discharge their function with full efficiency over an indefinite period of time.

At spaced intervals on the marginal portion of the upper surface of bottom plate 13, there is scribed thereon index markings 18 that cooperate with the markings on the ring 7 to determine the angle to which the carriage is to be moved when a miter cut is to be made.

Referring particularly to Fig. 5, a means is provided for clamping the carriage against movement relative to the stationary base 6 and ring 7, after the carriage has been rotated to its desired position. To this end, a non-circular recess 19 is formed in the upper surface of the bottom plate 13 of the carriage, in which is received a nut 20, that is in threaded engagement with the thumb screw 21. Thumb screw 21 is threadable in a suitable opening formed in the bottom plate, and between the head of the thumb screw and nut 19 is interposed a washer 22, a portion of which overlies the ring 7. By reason of this construction it will be observed that on threading of the thumb screw 21 in one direction, flange 12 will be drawn upwardly against flange 11 of the ring, while at the same time washer 22 is pressed downwardly against the said flange 11. The carriage is thus clamped in its adjusted position, and this is accomplished, as will be noted, without forcing it downwardly upon the anti-friction elements 14. Referring to Fig. 4, in the illustrated example of the apparatus, such a clamping means is provided at diametrically opposed portions of the apparatus. However, it will be understood that the clamps can be disposed otherwise, or in greater or in less numbers than shown.

Upstanding from the bottom plate 13 are spaced pairs of standards 23 and 24. Referring to Fig. 3, these are of inverted U-shape, having flat upper surfaces, and the standards are secured at their lower ends fixedly to the bottom plate 13 by any suitable means, such as welding or the like.

The pair of standards 23 support a flat table portion 25, preferably formed (see Fig. 2) in the shape of a segment of a circle. Standards 24 support another table portion 26 in spaced relation to the table portion 25, and the table portions are respectively secured to the standards 23 and 24 by any suitable means, such as countersunk bolts and nuts.

As may be noted from Fig. 2, the space between the table portions 25 and 26 is made relatively wide, and when the device is in use, the blade of a portable electric saw S extends downwardly into said space. The width of the space, as may be observed, is such that full clearance is permitted for adjusting the blade of the saw angularly from a vertical position, and when the blade is so adjusted, it will, in cooperation with my apparatus, result in the making of a double miter cut, which is often required. The adjustability of the saw blade in this manner is a feature found in practically all portable electric saws, and does not of course constitute part of the present invention.

Parallel to and spaced from the inner edge of the table portion 25 is a lower guide member 27, that is slidable in the direction of its length upon the table portion. Preferably, this slidable mounting is provided for by a longitudinal dovetailed flange 28 depending from the under side of the lower guide member 27, this flange being received in a dove-tail groove 29 formed in the table portion 25 (Fig. 3). A thumb screw 30 is threadable through the table portion 25 and into the tongue 28, for releasably clamping the lower guide member 27 in positions to which it is slidably adjusted.

Another lower guide member 31 is slidably mounted on the opposed table portion 26, thus having a depending tongue 32 received in dovetail groove 33 of the table portion, and this also is adapted to be releasably clamped by means of a thumb screw 34. An upper guide member 35 overlies the lower guide member 27, and this also is disposed parallel to the inner edge of the table portion 25. The upper guide member 35, however, is slidable transversely, that is toward and away from the opposite side of the apparatus, in a direction perpendicular to the direction of movement of the lower guide member 27. Preferably, I provide for this movement by the formation of slots 37 (Fig. 2) in the upper guide member 35, through which slots extend thumb screws 38 threadably into the lower guide member 27. It may be observed that the upper guide member 35 has formed along its inner longitudinal edge a depending flange 36, for a purpose which will be discussed hereafter.

Opposing the member 35 is another transversely adjustable guide member 39, having the depending flange 40 and the spaced transversely disposed slots 41 receiving thumb screws 42 threadable into lower guide member 31.

By reason of this construction, a slideway is provided for a portable saw S. A saw of this type has a flat base or guard on either side of its blade, the outer longitudinal edges of which are parallel and the under side of which is flat. It will therefore be apparent that a saw of this type may be positioned upon the table portions 25 and 26. When so positioned, its blade will extend downwardly into the space between said table portions. The opposed flat guards will rest upon the opposed table portions, and the transversely adjustable guide members 35 and 39 may be moved inwardly so as to abut the outer longitudinal edges of said guards. Lateral deviation of the saw S during use is thus effectively prevented.

Additionally, the longitudinally adjustable guide members 27 and 31 can be slidably adjusted so that they project beyond the apparatus proper, thus elongating the guideway along which the saw is urged in making cut.

In use of the device, the base 6 is first nailed down upon a suitable support so as to be immovable thereon. Such a support can be a pair of conventional saw horses (not shown) arranged side by side. Then, from any convenient pieces of lumber stock, a built up support is set up adjacent the apparatus, for supporting the lumber to be cut. The lumber support is readily squared with the apparatus by bringing it up against any of the straight edges of the base 6.

Now, to make a miter cut, the rotative carriage is adjusted as described heerinbefore, and clamped against movement relative to the base and ring.

Adjustment of the pairs of lower and upper guide members is now made to accommodate the particular saw being used and also to permit as much travel of the saw as may be necessary to complete a full cut. These guide members are also clamped in position, and the apparatus is now ready for use.

Advantages of the apparatus may now be noted as constituting ready portability, a minimum of parts, low cost of manufacture, and considerable versatility as to use. As to this last, it is believed important to note that the apparatus can be used in any direction, this permits it to be readily positioned convenient to an adjacent pile of lumber, rather than requiring the lumber to be brought around to one particular side of the apparatus. Where speed is a prime essential, in fact, it is conceivable that the saw operator can swing the apparatus between lumber supports set up at two or more sides of the device, so that while lumber is being placed upon or removed from one support, a cut can be made on lumber on another support.

What is claimed is:

1. Miter box apparatus for portable power saws including a base, a saw-supporting carriage mounted to rotate thereon, for relating a supported saw at a selected angle to material to be cut, table portions rigid with said carriage and elevated above the base, said table portions being spaced apart from end to end to define between them a space open at opposite ends and into which a blade of a power saw may extend, the top surfaces of the table portions defining bearing surfaces for said saw, to provide a slideway for the saw, and guide members mounted upon said table portions for slidable adjustment thereover transversely of the slideway, said guide members being slidably adjustable independently of each other and providing side walls for the slideway, the guide members when shifted to selected positions of adjustment upon the table portions being proportioned to leave selected areas of the top surfaces of the table portions exposed.

2. Miter box apparatus for portable power saws including a rectangular base, a degree-marked ring rigid therewith, a carriage mounted to rotate on the base and within the ring, clamping means for securing the carriage against movement relative to the ring and base after rotatable adjustment thereof, table portions rigid with said carriage and elevated above the base, said table portions being spaced apart from end to end to define between them a space open at opposite ends and into which a blade of a power saw may extend, the top surfaces of the table portions defining bearing surfaces for said saw, to provide a slideway for the saw, and guide members mounted upon said table portions for slidable adjustment thereover transversely of the slideway, said guide members being slidably adjustable independently of each other and providing side walls for the slideway, the guide members when shifted to selected positions of adjustment upon the table portions being proportioned to leave selected areas of the top surfaces of the table portions exposed.

3. Miter box apparatus for portable power saws including a flat rectangular base, a degree-marked ring rigid therewith, a flat bottom plate mounted to rotate on the base and within the ring, means for clamping the plate to the ring in positions to which rotatably adjusted, standards upstanding from the bottom plate, table portions secured to the standards and spaced apart from end to end to define between them a space open at opposite ends and into which a blade of a power saw may extend, the top surfaces of the table portions defining bearing surfaces for said saw, parallel lower guide members mounted on the respective table portions for slidable adjustment in the direction of their lengths, said lower guide members being proportioned to expose a part of said top surfaces, parallel upper guide members slidably mounted on the first-named guide members for independent adjustment toward and away from each other over said bearing surfaces and constituting means for making individual width adjustments of the bearing surfaces, said guide members and table portions constituting a slideway for a portable power saw, and means for securing the respective guide members in positions to which adjusted.

WILLIAM HESS.

REFERENCES CITED

The following references are of record in the file of this patent:

UNITED STATES PATENTS

| Number | Name | Date |
|---|---|---|
| 359,720 | Githens | Mar. 22, 1887 |
| 1,457,492 | Bloodgood | June 5, 1923 |
| 1,584,086 | Fonda | May 11, 1926 |
| 1,618,341 | Howland | Feb. 22, 1927 |
| 1,816,069 | Bennett | July 28, 1931 |
| 1,842,630 | Rodning | Jan. 26, 1932 |
| 2,208,582 | Hollister | July 23, 1940 |
| 2,340,450 | Bouschor | Feb. 1, 1944 |